United States Patent Office 2,874,132
Patented Feb. 17, 1959

2,874,132

ANION-EXCHANGE RESINS FOR SUGAR DECOLORIZATION AND THEIR PREPARATION

Edward F. Riener, Haddonfield, N. J., assignor to Rohm & Haas Company, Philadelphia, Pa., a corporation of Delaware No Drawing. Application November 2, 1956
Serial No. 619,960

19 Claims. (Cl. 260—2.1)

This invention relates to anion-exchange resins and to their preparation and use. It relates to nitrogenous resins which are insoluble in aqueous solutions of acids, bases, and salts, and which are particularly suitable for use in the removal of color-bodies from sugar solutions.

In U. S. Patent 2,591,573, which was issued to C. H. McBurney on April 1, 1952, there was disclosed a resin which is the reaction product of a tertiary amine and an insoluble, cross-linked, copolymer of an aromatic monovinyl hydrocarbon and an aromatic divinyl hydrocarbon, which copolymer contains haloalkyl groups having the formula —$C_nH_{2n}X$ in which X is a chlorine or bromine atom and —$C_nH_{2n}$ is an alkylene group in which $n$ is an integer of from one to four. The resins of McBurney are insoluble, aromatic, cross-linked vinyl copolymers containing substituent groups having the general formula:

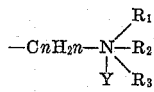

in which $n$ is an integer of from one to four; $R_1$, $R_2$, and $R_3$ are hydrocarbon groups; and Y is an anion, such as a chloride, sulfate, or hydroxyl ion.

In the present invention the resins are prepared in a manner similar to those of McBurney except that, at the point where he introduces haloalkyl groups, there has been newly added a diether of the formula

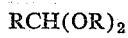

or $R_2C(OR)_2$, commonly termed acetals and ketals, respectively. (As both acetals and ketals perform the same function in this invention, and as no distinction with respect thereto usually is made in the literature, the former term will hereinafter be employed but will be understood to refer to both; in essence, the term acetal will hereinafter refer to a dialkoxyalkane where both alkoxy groups are on the same carbon atom.)

The product of the present invention is, like the resin of McBurney, an insoluble, polymeric, quaternary ammonium compound, and is extremely basic. Like that prior art product, the resins of the present invention can be used in the treatment of acidic liquids and gases to remove the acidity of the fluid. In one particular highly valuable commercial application, however, the resins of this invention far surpass the performance of the named or other known prior art ion-exchangers, namely in the decolorization of sugar. As a result, there has hereby been provided a new anion-exchange resin and a method of purifying sugar solutions therewith which has exceptional commercial advantages over comparable materials and processes that heretofore have been known. These accomplishments will become evident as the description of the unique resins, their method of preparation, and their application in decolorizing sugar solutions proceeds below.

In the preferred process for making the improved resins, a series of well-defined steps are followed. First, an insoluble hydrocarbon copolymer is prepared by copolymerizing a monovinyl hydrocarbon such as styrene or vinyl naphthalene and a divinyl hydrocarbon such as divinyl benzene. The insoluble copolymer, in the form of small particles, is then reacted with a mixture of haloalkylating agents and an acetal. The haloalkylating agents may suitably be selected from a mixture of an aldehyde and a halogen acid (e. g., paraformaldehyde and hydrochloric acid) or a dihaloalkane and a Friedel-Crafts catalysts (e. g., ethylene dichloride and aluminum chloride) or a haloether and aluminum chloride, as exemplified below. The acetal may appropriately be chosen from 1,1 dialkoxy methane, -ethane, -propane, -butane, -pentane, -hexane, -heptane, -octane, or -nonane. The resultant copolymer is then reacted with a tertiary amine whereby there is obtained an insoluble, cross-linked, polymeric, quaternary ammonium salt. A final washing with an hydroxide of an alkali metal converts the quaternary ammonium salt to a quaternary ammonium hydroxide.

In preparing the resin of the present invention, the process may be subdivided into three main steps or procedures, in a manner comparable to that set forth in the example given in the above-mentioned McBurney Patent 2,591,573. The first step, which may be labeled Part A, is practically identical with that of Part A given by McBurney. It consists of preparing the hydrocarbon copolymer by polymerizing a monovinyl hydrocarbon together with a divinyl hydrocarbon. That is, an aromatic hydrocarbon containing one vinyl substituent is copolymerized with an aromatic hydrocarbon containing two vinyl substituents. Hydrocarbons of the first class are typified by the following: Styrene, ortho-, meta-, and para-methyl styrenes, ortho-, meta-, and para-ethyl styrenes, vinyl naphthalene, vinyl anthracene, and the homologues of the above. While divinyl benzene is the divinyl hydrocarbon of first choice, others which are operable include divinyl toluenes, divinyl naphthalenes, divinyl ethyl benzenes, divinyl xylenes, and trivinyl benzene.

In preparing the copolymers the predominant amount, on a molar basis, of the monovinyl hydrocarbon is employed. That is to say, the monovinyl hydrocarbon may constitute up to 99.95%, on a molar basis, of the mixture of vinyl hydrocarbons. In cases where it is preferred to make the final resinous product porous, which is generally the situation when it is employed for sugar decolorization purposes, it is preferred that the amount of the divinyl hydrocarbon constitute 0.05 to 4% of the mixture on a molar basis. Even higher amounts of the divinyl hydrocarbon may be employed, when porosity of the resin is not so important, but is still should be definitely in the minority in comparison with the monovinyl hydrocarbon. Copolymers of a cross-linking divinyl hydrocarbon and a mixture of two or more monovinyl hydrocarbons are included within the scope of this invention. Such combinations are typified by the following: Styrene, ethyl vinyl benzene and divinyl benzene; styrene, vinyl naphthalene and divinyl benzene; m-methyl styrene, styrene and divinyl benzene; styrene and divinyl benzene.

The insoluble copolymers of the aromatic mono- and divinyl hydrocarbons may be prepared by a variety of well-known methods. Thus, the monomers may be mixed and then polymerized en masse or they may be emulsified or otherwise suspended in a liquid medium and then polymerized. Emulsion- and suspension-polymerization in which the monomers are first suspended in a non-solvent for the monomers such as water or brine solution and are then heated, agitated, and copolymerized, are much preferred because these methods yield hard copolymers in the form of small spheroids, globules, or "beads"; and the size of such particles can be regulated and controlled. Thus, particles ranging in size from 5 to 325 mesh may be prepared. The extremely fine particles of approximately 40 to 150 microns in diameter are particularly useful in certain new ion-adsorbing techniques. Furthermore, very fine or porous particles may be haloalkylated and simultaneously treated with an acetal in accordance with the present invention, and ultimately aminated more rapidly and more extensively than particles which are larger and/or more dense. A modification of the suspension-polymerization method which produces very desirable results involves suspending and polymerizing a solution of the monomers in a chemically inert solvent which is immiscible with the suspending liquid and later removing the occluded or trapped solvent by leaching, drying, or distilling from the hard, polymerized particles. This process yields particles of resin which are more porous due to the escape of the solvent, and which, due to their porosity, react more readily. However, large masses or blocks of the polymer may be made and subsequently comminuted before being subjected to the haloalkylating and acetal treatments.

The polymerization of the vinyl compounds is accelerated by means of well-known initiators which provide free radicals. These catalysts include ozone, organic peroxidic agents typified by ozonides, peroxides such as acetyl peroxide, lauroyl peroxide, stearoyl peroxide, tert.-butyl hydroperoxide, benzoyl peroxide, tert.-butyl perbenzoate, di-tert.-butyl diperphthalate, di-tert.-butyl peroxide, and the barium salt of tert.-butyl hydroperoxide, inorganic agents such as barium peroxide, sodium peroxide, and hydrogen peroxide. The initiators are employed in suitable amounts ranging from 0.1% to about 2.0% based on the weight of the monomeric material to be polymerized.

The second step, or Part B in the preparation of the products of this invention, is one in which the insoluble, infusible, cross-linked polyvinyl hydrocarbon is treated with a haloalkylating agent and an acetal. This step involves treating the polymer with the acetal at the same time that a plurality of bromoalkyl or, preferably, chloroalkyl groups are introduced into said polymer. By said groups is meant those having the general formula $$-C_nH_{2n}X$$

as described above. Although these groups may contain one to four carbon atoms, it is preferred to employ those compounds in which chloromethyl groups, $$-CH_2Cl$$

are added to the insoluble polymer, because the chloromethyl products are by far the most reactive. The carbon atoms in the group, $-C_nH_{2n}X$ may be in a straight or a branched chain.

The haloalkylating step or treatment may be carried out in a variety of ways. For example, the polymer may be reacted with a mixture of an aldehyde and hydrochloric acid, or a mixture of a dihalide and a Friedel-Crafts catalyst. Methods of chloroalkylating which may be used for introducing the $-CH_2Cl$ group and which also serve as guides for introducing $-C_2H_4X$, $-C_3H_6X$, and $C_4H_8X$ groups are described in "Organic Reactions," vol. I, chapter 3, page 63 et seq. (John Wiley & Sons, Inc., N. Y. C., 1942).

The extent of the haloalkylation reaction may be conveniently determined by a halogen analysis. It is desirable that as many haloalkyl groups as possible be introduced into the insoluble copolymer because the number of such groups determines the number of quaternary ammonium groups in the final product; and, of necessity, the number of such quaternary ammonium groups determines the ultimate capacity of the resin to adsorb anions. Although resins containing relatively few quaternary ammonium groups have some capacity for adsorbing or exchanging anions, it is necessary from a practical standpoint to add a large number of such groups in order to produce a resin of sufficiently high capacity as to be commercially attractive. The minimum number of such groups should be one for every 15 aromatic hydrocarbon nuclei in the polymer. This, of course, requires that at least one haloalkyl group be first added for every 15 aromatic hydrocarbon nuclei; and in the case of a chloromethylated copolymer of styrene and 1% divinylbenzene such a product would analyze about 2% chlorine. The upper limit is that reached when every available position in the aromatic nuclei is haloalkylated. Satisfactory resins of high capacity can be made in which the number of haloalkyl groups, and, hence, the number of quaternary ammonium groups which are introduced is less than the theoretical maximum. Thus, very valuable resins are those made by aminating, with a tertiary amine, copolymers containing from 3 to 6 haloalkyl groups for every four aromatic hydrocarbon nuclei.

The third step, which we may call part C, in analogous to the comparable step in the aforementioned McBurney patent. It involves the amination with a tertiary amine of the copolymer which has been treated with the haloalkylating agent and the acetal. This reaction preferably is carried out by adding the amine to the polymer resulting from the treatments described in part B above while the latter is suspended and agitated in a liquid which is a solvent for the amine. The mixture may be allowed to react at room temperature or, preferably, at somewhat elevated temperatures, after which the resin, containing quaternary ammonium salt groups, is freed of the liquid.

The tertiary amine is used in the form of the free base. Tertiary amines containing unsubstituted hydrocarbon substituents are operable. The hydrocarbon substituents of the amine may be alkyl groups, aryl groups, cycloalkyl groups and aralkyl groups. Suitable tertiary amines are typified by the following: Trimethyl amine, triethyl and tripropyl amines, dimethyl ethyl amine, diethyl cyclohexyl amine, tricyclohexyl amine, triphenyl amine, diphenyl ethyl amine, benzyl dimethyl amine, benzyl phenyl methyl amine, dimethyl amino ethanol and other hydroxyl substituted amines, and the like.

As has been stated, the products of this invention are insoluble, infusible quaternary ammonium compounds. As prepared, they are quaternary ammonium salts; but the salts may be readily converted into quaternary ammonium hydroxides by washing with a hydroxide of an alkali metal.

The following examples serve to illustrate the preferred methods of preparing the products of this invention.

*Example 1*

*Part A.*—Into a one-liter, three-necked, balloon flask equipped with thermometer, mechanical stirrer, and reflux condenser are poured 400 ml. of water and 34 ml. of a 1.5% aqueous solution of magnesium silicate. The solution is agitated, and at the same time there is added to the contents of the flask 99.5 g. of styrene, 0.5 g. of divinyl benzene, and 1 g. of benzoyl peroxide. The stirred mixture is then heated to 90° C. and held there for one and one-half hours, after which the mixture is heated to between 96° and 98° C. for an additional one and one-half hours. The reaction mixture is then cooled to room temperature and the solid spheroids of the copolymer are separated from the liquid by decantation and filtration, air-dried, and finally oven-dried for about eight hours at 125° C.

In a similar manner copolymers containing higher amounts of divinyl benzene may be prepared.

*Part B.*—Into a five-liter, three-necked, balloon flask equipped with thermometer, mechanical stirrer, and reflux condenser is placed the following materials in accordance with the procedure described below: 225 g. of chloromethyl ether, 130 g. of anhydrous, powdered aluminum chloride, 2058 g. of ethylene dichloride, and 43 g. of methylal. (Note.—The amount of methylal which is employed is based on the amount of the copolymer beads. As will be explained later, the weight of the acetal which is used can be varied from 10 to 40% of the weight of the beads. In this example, 19% methylal is employed; that is to say, 19% of 225 g. (weight of the beads) or 43 g.)

The flask is charged with the ethylene dichloride and the methylal mixture. The chloromethyl ether is added next and the contents of the flask are agitated for ten minutes. The beads from part A are then introduced and the contents agitated for one-half hour at a temperature of from 25° to 30° C. The temperature is adjusted to between 30° and 40° C., and the aluminum chloride is then added in increments of about one-sixth of its total quantity at twenty minute time intervals. The reaction mixture is cooled by any convenient means to maintain the prescribed temperature of 30° to 40° C. and held at that temperature for about six hours. Ice-water is added until the flask is almost filled, and the contents are then agitated and allowed to settle into two layers or phases. The water and the ethylene dichloride layers are then siphoned off, the flask filled with tap-water, re-agitated for one-half hour and then allowed to settle, and the liquor (which is almost all water by this time) is siphoned off. The flask is filled with tap-water and about 30 g. of sodium bicarbonate is added to it. The contents are agitated for one hour, permitted to settle, and the water again is siphoned off. Twice more the beads are washed with tap-water, agitated about ten minutes, permitted to settle, and the water drained off.

Part C.—The moist beads obtained from part B above are used "as is" in the next step. 1790 g. of the moist beads and 2440 g. of tap-water are introduced into a five-liter, three-necked balloon flask equipped with agitator, reflux condenser, thermometer, and a gas-inlet tube. The mixture is stirred with agitation to about 30° C., and then 170 g. of trimethylamine gas is introduced through the tube while the mixture is maintained between 30° to 40° C. with the aid of intermittent, external water cooling. The mixture is held at this temperature for about two hours, then stirred to reflux and the distillate removed through the condenser in order to eliminate the ethylene dichloride and excess trimethylamine. When the reflux temperature is reached, water is added dropwise to the flask to maintain the original liquid level. The distillate removal is continued until the distillate that remains is only water, i. e., contains no organic material. Then the liquor (water) is siphoned off, and the beads are washed with water until the wash-water possesses a neutral pH value. The excess water is then siphoned off, using suction, leaving the moist beads, the final product of the present invention.

Example 2

The process of Example 1 is repeated, except that, in part B, 10.0% methylal, based on the weight of the copolymer beads, is employed.

Example 3

The process of Example 1 is repeated, except that, in part B, 21.0% methylal, based on the weight of the copolymer beads, is employed.

Example 4

The process of Example 1 is repeated, except that, in part B, 24.0% methylal, based on the weight of the copolymer beads, is employed.

Example 5

The process of Example 1 is repeated, except that, in part B, 30.0% methylal, based on the weight of the copolymer beads, is employed.

Example 6

The process of Example 1 is repeated, except that, in part B, 37.0% methylal, based on the weight of the copolymer beads, is employed.

Example 7

The process of Example 1 is repeated, except that, in part B, 40.0% methylal, based on the weight of the copolymer beads, is employed.

Example 8

The process of Example 1 is repeated, except that, in part B, 30% of 1,1 dimethoxybutane is employed in place of the methylal.

Example 9

The process of Example 1 is repeated, except that, in part B, 30% of 1,1 dimethoxynonane is employed in place of the methylal.

Example 10

The process of Example 1 is repeated, except that, in part B, 30% of 2,2 dimethoxyhexane is employed in place of the methylal.

Illustrations of the advantages of the resin of this invention are given below. As their most spectacular improvement over prior art ion-exchange resins has been demonstrated in connection with their vastly superior sugar decolorization capacities, examples of this function will be given below, and a comparison made with the analogous capacity of the McBurney resin referred to above. In order to have a basis for measurement and comparison, it will be necessary to describe a sugar decolorization capacity test method which has recently been devised by workers in this field. It consists essentially of the following steps. A given weight, say 150 g., of standardized raw cane sugar is dissolved with deionized water to make up a total volume of 470 ml. This is a 30% sugar solution which must be freshly prepared prior to each test as any bacterial growth in the solution will render the test invalid. In each of four 50 ml. graduated cylinders are placed 35 ml. portions of the prepared sugar solution and the resin sample to be tested is added to each of the cylinders, enough being added to the first to bring its volume up to 37 ml., to the second until its volume is 40 ml., to the third until its volume is 45 ml., and to the fourth until its volume is 50 ml. The contents of each graduated cylinder are emptied into corresponding flasks, using as a rinse 15 ml. portions of the prepared sugar solution for each of the cylinders. The flasks may then be identified by numbers 2, 5, 10, and 15, corresponding to the amounts of increase in volume caused by the addition of the resin to the cylinders. The flasks are tightly stoppered and then placed in a reciprocating shaking apparatus so that they are uniformly shaken for thirty minutes. The liquid in each flask is filtered through glass wool into a corresponding G. H. (Gardner-Holdt) viscosity tube until those tubes are filled to the first mark from the bottom, after which they are cork-stoppered up to that mark. These tubes are labeled 2, 5, 10, and 15 as before.

A set of eleven standard sugar solutions is prepared per the following chart. This set of standard solutions is never used for more than one series of determinations.

| Ml. of deionized water | Ml. of prepared sugar solutions | Standard prepared, percent |
|---|---|---|
| 10.0 | 0.0 | 0 |
| 9.0 | 1.0 | 10 |
| 8.0 | 2.0 | 20 |
| 7.0 | 3.0 | 30 |
| 6.0 | 4.0 | 40 |
| 5.0 | 5.0 | 50 |
| 4.0 | 6.0 | 60 |
| 3.0 | 7.0 | 70 |
| 2.0 | 8.0 | 80 |
| 1.0 | 9.0 | 90 |
| 0.0 | 10.0 | 100 |

The solutions used in this set of standards are also placed in G. H. viscosity tubes and corked as explained above.

The sample solutions are evaluated against standard solutions by use of a conventional optical color comparator. After the determination is made of the standard which most closely approaches the color of the sample, the percentage of decolorization is determined by subtracting the percentage standard from 100% (i. e., % Decolorization=100%—Standard). This value is then plotted against the ml. of resin on regular graph paper. The amount of resin at the 50% decolorization point on the graph is determined and this value is divided into 7.5. The result is a measure, in g./ml., of the sugar decolorizing capacity (SDC) of the resin.

Using this method for determining sugar decolorization capacity, it has been observed that resins of the type described in the aforementioned McBurney patent have an SDC which often is below 1.0. By comparison, resins made in accordance with the present invention have been able to attain an SDC of as high as 4.68, and an average over a large number of runs of approximately 3.30, which represents a maximum increase of over 450% and an average increase of well over 300%. As earlier mentioned, the preferred ranges for use of the acetal as described in the examples given above are from 10 to 40% based on the weight of the copolymer beads which are treated with the acetal. It has been noted that the SDC of the resins of this invention increases steadily as the amount of the acetal employed is increased up to about 30% based on the weight of the copolymer beads. As the acetal is still further increased there appears to be no comparable increase of the SDC so that at 40% based on the polymer beads a limit appears to be reached beyond which further additions of the acetal are economically not feasible.

The resins of this invention may be regenerated in the same manner as their prior art counter-parts, as for example, by washing with a solution of sodium chloride or a strong base such as sodium hydroxide. Thus, in addition to being chemically active, the resins have such physical characteristics as to be capable of repeated use and regeneration in conventional water-treating equipment.

I claim:

1. An insoluble resinous quaternary ammonium composition suitable for the removal of anions from fluids, and particularly color bodies from sugar solutions, which comprises the product of the reaction of: (1) a tertiary amine and (2) a condensation product of (*a*) a copolymer of a mixture of an aromatic monovinyl hydrocarbon and an aromatic divinylhydrocarbon of which mixture the monovinyl hydrocarbon constitutes the predominant proportion, and (*b*) a haloalkylating agent which provides haloalkyl groups having the general formula $$-C_nH_{2n}X$$

in which $n$ has a value of one to four and X is a member of the group consisting of chlorine and bromine, which copolymer and haloalkylating agent have been condensed in the presence of an acetal of the formula

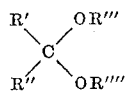

in which R' and R" are members of the class consisting of hydrogen and an alkyl group, R''' and R'''' are both alkyl groups, and R'+R" having a total of from one to eight carbon atoms, said acetal being present in an amount by weight equal to at least about 10 percent of the copolymer; the resulting quaternized reaction product containing on the aromatic nuclei quaternary ammonium groups having the general formula

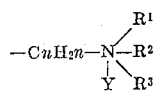

in which $n$ has a value of one to four, $R^1$, $R^2$, and $R^3$ represent monovalent hydrocarbon groups and Y is an anion, the number of said quaternary ammonium groups being at least one for every 15 aromatic nuclei and also being substantially equal to the number of haloalkyl groups in the said copolymer.

2. The composition of claim 1 in which the acetal is 1,1 dimethoxymethane.

3. The composition of claim 1 in which the acetal is 1,1 dimethoxyethane.

4. The composition of claim 1 in which the acetal is 1,1 dimethoxybutane.

5. The composition of claim 1 in which the acetal is 1,1 dimethoxynonane.

6. The composition of claim 1 in which the acetal is 2,2 dimethoxyhexane.

7. The composition of claim 1 in which the monovinyl hydrocarbon is styrene, the divinylhydrocarbon is divinylbenzene, and the haloalkyl groups provided by the haloalkylating agent are chloromethyl groups.

8. The composition of claim 1 in which the monovinyl hydrocarbon is styrene, the divinylhydrocarbon is divinylbenzene, and the haloalkyl groups provided by the haloalkylating agent are bromomethyl groups.

9. An insoluble resinous quaternary ammonium composition suitable for the removal of anions from fluids, and particularly color-bodies from sugar solutions, which comprises the reaction product of: (1) a copolymer of a mixture of an aromatic mono-vinyl hydrocarbon and an aromatic divinyl hydrocarbon which has been condensed with a haloalkylating agent in the presence of an acetal, said acetal being present in an amount by weight equal to at least about 10 percent of the copolymer, said mixture containing a predominant amount of said monovinyl hydrocarbon and said copolymer containing substituent groups of the formula —$CH_2Cl$ on the aromatic nuclei; and (2) a tertiary amine.

10. An insoluble resinous quaternary ammonium composition suitable for the removal of anions from fluids, and particularly color-bodies from sugar solutions, which comprises the reaction product of: (1) a copolymer of a mixture of styrene and divinyl benzene which has been condensed with a haloalkylating agent in the presence of an acetal, said acetal being present in an amount by weight equal to at least about 10 percent of the copolymer, said mixture containing a predominant amount of styrene and said copolymer containing substituent groups of the formula —$CH_2Cl$ on the aromatic nuclei; and (2) a tertiary amine.

11. The process of preparing quaternary ammonium anion-exchange resins which comprises first copolymerizing a major proportion of an aromatic monovinyl hydrocarbon with a minor proportion of a divinylhydrocarbon, next condensing the insoluble, infusible, cross-linked polyvinyl hydrocarbon resulting therefrom simultaneously with a haloalkylating agent, which provides haloalkyl groups having the general formula —$C_nH_{2n}X$ in which $n$ is equivalent to one to four and X is a member of the class consisting of chlorine and bromine, in the presence of an acetal of the formula

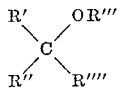

in which R' and R" are members of the class consisting of hydrogen and an alkyl group, R''' and R'''' are both alkyl groups, and R'+R" having a total of from one to eight carbon atoms, said acetal being present in an amount by weight equal to at least about 10 percent of the copolymer; and finally quaternizing the haloalkylated and acetalated polymer with a tertiary amine.

12. The process of claim 11 in which the amount of acetal employed is from about 10% to about 40%, based on the weight of the copolymers.

13. The process of claim 11 in which the monovinyl hydrocarbon is styrene and the divinylhydrocarbon is divinylbenzene.

14. The process of claim 13 in which the amount of acetal employed is from about 10% to about 40%, based on the weight of the copolymer.

15. The process of claim 11 in which the haloalkylating agent employed provides chloromethyl groups.

16. The process of claim 11 in which the haloalkylating agent employed provides bromomethyl groups.

17. The process of removing color bodies from a sugar solution which comprises bringing said solution into contact with the product of claim 1.

18. The process of removing color bodies from a sugar solution which comprises bringing said solution into contact with the product of claim 7.

19. The process of removing color bodies from a sugar solution which comprises bringing said solution into contact with the product of claim 8.

References Cited in the file of this patent

UNITED STATES PATENTS 2,578,938  Kunin _____ Dec. 18, 1951